United States Patent [19]

Engelhardt

[11] 4,400,958
[45] Aug. 30, 1983

[54] SYSTEM FOR MEASURING THE THICKNESS OF A STRIP EMERGING FROM A ROLLING MILL

[75] Inventor: Werner Engelhardt, Erlangen, Fed. Rep. of Germany

[73] Assignee: Siemens Aktiengesellschaft, Munich, Fed. Rep. of Germany

[21] Appl. No.: 284,996

[22] Filed: Jul. 20, 1981

[30] Foreign Application Priority Data

Aug. 1, 1980 [DE] Fed. Rep. of Germany ....... 3029337

[51] Int. Cl.³ .............................................. B21B 37/02
[52] U.S. Cl. .......................................... 72/16; 72/707; 73/37.7
[58] Field of Search .......................... 72/16, 127, 707; 271/DIG. 3, 193; 73/37.7; 83/224; 198/619, 805

[56] References Cited

U.S. PATENT DOCUMENTS 3,610,695 10/1971 Yabuta ................................ 198/619
3,855,830 12/1974 Kitanosono et al. ................... 72/16

Primary Examiner—Francis S. Husar
Assistant Examiner—Jonathan L. Scherer
Attorney, Agent, or Firm—Kenyon & Kenyon

[57] ABSTRACT

An arrangement for measuring the thickness of a strip emerging from a rolling mill is provided with a thickness measuring device and at least one linear inductor. The linear inductor exerts a pulling force on the strip which flatens the strip in the vicinity of the measuring device. This permits a measuring beam from the measuring device to pass through the strip in a direction orthogonal to the surface of the strip. In some embodiments, a plurality of linear inductors may be provided on either side of the strip, and on either side of the measuring device. The frequency of operation of the linear inductors may be controlled by a converter, in response to the speed of the emerging strip.

4 Claims, 2 Drawing Figures

SYSTEM FOR MEASURING THE THICKNESS OF A STRIP EMERGING FROM A ROLLING MILL

BACKGROUND OF THE INVENTION

This invention relates generally to measuring arrangements, and more particularly, to a system for measuring the thickness of a strip emerging from a rolling mill, by means of a thickness measuring device.

A strip of material which emerges from a rolling mill runs unsupported until it is taken up by a reel. However, relatively thin strip materials assume a wavy shape which allows a beam from a thickness measuring device to pass orthogonally through the strip only at the crest or valley points of the wave. The measuring beam penetrates the strip at an angle with respect to the surface at all points between the crest and wave points of the wave. It is a problem with such thickness measuring systems that inaccuracies are produced in the measuring results.

It is, therefore, an object of this invention to provide a thickness measuring system wherein the strip is arranged horizontally and flat in the vicinity of the measuring device.

SUMMARY OF THE INVENTION

The foregoing and other objects are achieved by this invention which provides at least one linear inductor in the immediate vicinity of the thickness measuring device, for generating a traveling field at a small distance from one of the strip surfaces. The linear inductor exerts upon the strip pulling forces in the rolling direction which prevent waves from being formed in the strip, thereby preventing incorrect measurements. The linear inductor is advantageously connected to a converter, the frequency of which is controllable. In this manner, the pulling forces can be matched to the velocity of the strip.

BRIEF DESCRIPTION OF THE DRAWINGS

Comprehension of the invention is facilitated by reading the following detailed description in conjunction with the annexed drawings, in which.

DETAILED DESCRIPTION

Figure 1:
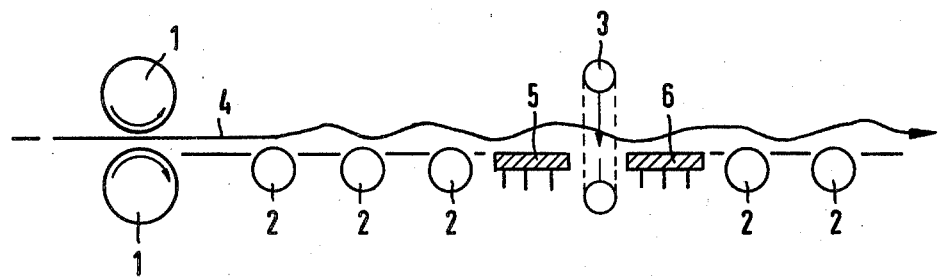
FIG. 1 is a schematic representation of a strip emerging from a rolling mill having wavy surface characteristics.

FIG. 1 shows a roll stand which is indicated by a pair of working rolls 1, which are followed by a roller table consisting of rolls 2. A thickness measuring device 3, which may be of the type which operates with gamma rays, is arranged on the roller table. A strip 4 of relatively thin material emerges from between working rollers 1 and is shown to assume a wavy cross-sectional configuration as it travels over rollers 2. Two linear inductors 5 and 6, which may be of the type which are excitable by three-phase current, are arranged on either side of thickness measuring device 3. If the linear inductors are not switched on, strip 4 assumes the wavy shape, as shown. As a result of the wavy condition of strip 4, the measuring beam of measuring device 3 does not strike the strip surface perpendicularly, thereby preventing the measuring result from corresponding to the actual thickness of the strip.

Figure 2:
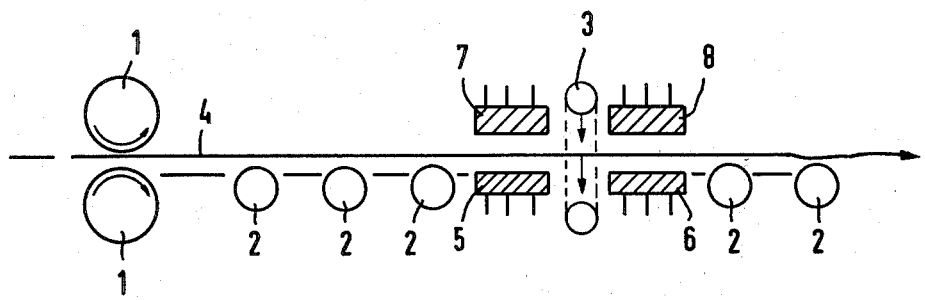
FIG. 2 shows the arrangement of FIG. 1 after the linear inductor has flatened the strip material.

FIG. 2 shows the arrangement of FIG. 1 and uses the same reference symbols. In FIG. 2, however, a further pair of linear inductors 7 and 8 are provided above strip 4. As shown, linear inductors 5, 6, 7, and 8 are energized so as to cause the strip to assume a horizontal and flat configuration in the measurement region of thickness measuring device 3. It is an advantage of this invention that four linear inductors may be arranged in the manner shown in FIG. 2. Alternatively, two linear inductors may be used in a selectable arrangement of one each on the upper and lower surfaces of the strip, either before or after the measuring device, or both linear inductors on the same side of the strip, one before and one after the measuring device.

The magnitude of the pulling forces which are exerted upon the strip by the traveling fields from the linear inductors can be adapted to the velocity of the strip by using frequency controlled converters for supplying the linear inductors. Damage to the surface of the strip is prevented because the strip is made to float by the linear inductors.

Although the invention has been described in terms of specific embodiments and applications, it is to be understood that persons skilled in the pertinent art, in light of this teaching, can generate additional embodiments for other applications, without departing from the scope of the invention. For example, such additional embodiments can be used for correctly measuring the width of the strip. Accordingly, it is to be understood that the drawings and descriptions in this disclosure are merely illustrative of the principles of the invention, and should not be construed to limit the scope thereof.

What is claimed is:

1. An arrangement for measuring a strip emerging from a rolling mill, the arrangement having a thickness-measuring device, the arrangement further comprising at least one linear inductor arranged in the vicinity of the thickness-measuring device whereby said linear inductor generates a traveling field which exerts upon the strip a tensile force for flattening the strip in the vicinity of the thickness-measuring device, thereby improving the accuracy of a thickness measurement of the strip by the thickness-measuring device.

2. The arrangement of claim 1 wherein there is further provided a second linear inductor, said first and second linear inductors being arranged respectively above and below the strip.

3. The arrangement of claim 2 wherein said first and second linear inductors are arranged on the same side of the strip, and respectively before and after the measuring device.

4. The arrangement of claim 1 wherein there is further provided a converter for controlling the frequency of said linear inductor.

* * * * *